US 8,738,410 B2

(12) United States Patent
Cogswell et al.

(10) Patent No.: US 8,738,410 B2
(45) Date of Patent: May 27, 2014

(54) METHODS AND SYSTEMS FOR MANAGING ELECTRONIC WORK INSTRUCTIONS FOR MANUFACTURE OF PRODUCT

(75) Inventors: Thomas A. Cogswell, Somis, CA (US); Ross J. Cardilino, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 1421 days.

(21) Appl. No.: 11/756,043

(22) Filed: May 31, 2007

(65) Prior Publication Data
US 2008/0300710 A1 Dec. 4, 2008

(51) Int. Cl.
*G06Q 10/00* (2012.01)
*G06Q 10/06* (2012.01)

(52) U.S. Cl.
CPC .............. *G06Q 10/063* (2013.01); *G06Q 10/06* (2013.01)
USPC ........................................ 705/7.11; 700/105

(58) Field of Classification Search
CPC .................................................. G06Q 10/063
See application file for complete search history.

(56) References Cited

U.S. PATENT DOCUMENTS

| | | | | |
|---|---|---|---|---|
| 4,445,180 A | * | 4/1984 | Davis et al. | 700/289 |
| 5,148,370 A | | 9/1992 | Litt et al. | |
| 5,398,336 A | | 3/1995 | Tantry et al. | |
| 5,594,639 A | | 1/1997 | Atsumi | |
| 5,596,502 A | | 1/1997 | Koski et al. | |
| 5,793,638 A | * | 8/1998 | Yao et al. | 700/226 |
| 5,877,961 A | * | 3/1999 | Moore | 700/180 |
| 5,993,041 A | | 11/1999 | Toba | |
| 6,081,090 A | * | 6/2000 | Takaki et al. | 318/567 |
| 6,108,662 A | * | 8/2000 | Hoskins et al. | 700/95 |
| 6,133,914 A | * | 10/2000 | Rogers et al. | 345/661 |
| 6,268,853 B1 | * | 7/2001 | Hoskins et al. | 700/83 |
| 6,516,239 B1 | * | 2/2003 | Madden et al. | 700/115 |
| 6,556,950 B1 | * | 4/2003 | Schwenke et al. | 702/183 |
| 6,584,369 B2 | | 6/2003 | Patel et al. | |
| 6,615,097 B2 | | 9/2003 | Ozaki | |
| 6,618,856 B2 | * | 9/2003 | Coburn et al. | 717/135 |
| 6,684,121 B1 | | 1/2004 | Lu et al. | |
| 6,714,986 B2 | * | 3/2004 | Karibe et al. | 709/240 |
| 6,725,116 B2 | * | 4/2004 | Sanada et al. | 700/115 |
| 6,788,985 B2 | * | 9/2004 | Mitsutake et al. | 700/97 |
| 6,828,963 B1 | * | 12/2004 | Rappoport | 345/419 |
| 6,862,553 B2 | * | 3/2005 | Schwenke et al. | 702/183 |

(Continued)

FOREIGN PATENT DOCUMENTS

EP 1672548 A1 * 6/2006 ............. G06F 17/50
WO 03056480 A2 7/2003

OTHER PUBLICATIONS

The Development of an Agent-based Distributed Surface Machining System Y.C. Kao1, M.S. Chen2, J.S. Lia3. Proceedings of the 35th International MATADOR Conference Formerly the International Machine Tool Design and Research Conference. Jun. 30, 2007.*

(Continued)

*Primary Examiner* — Brett Feeney
(74) *Attorney, Agent, or Firm* — Armstrong Teasdale LLP (57) ABSTRACT

Methods and systems for interfacing computer modeled design and manufacture data from an Manufacturing Process Planning (MPP) system to a Manufacturing Execution System (MES) and allowing, via an integration server interface, electronic work instructions of the MPP system to be revised promptly and efficiently in mid-production manufacturing processes.

19 Claims, 6 Drawing Sheets

(56) References Cited

U.S. PATENT DOCUMENTS

| | | | |
|---|---|---|---|
| 6,983,189 B2 | 1/2006 | Lu | |
| 6,993,456 B2* | 1/2006 | Brooks et al. | 702/183 |
| 7,069,101 B1* | 6/2006 | Arackaparambil et al. | 700/121 |
| 7,082,345 B2* | 7/2006 | Shanmugasundram et al. | 700/121 |
| 7,099,803 B1* | 8/2006 | Rappoport et al. | 703/1 |
| 7,103,434 B2* | 9/2006 | Chernyak et al. | 700/98 |
| 7,117,061 B1* | 10/2006 | McKenzie | 700/116 |
| 7,149,677 B2* | 12/2006 | Jayaram et al. | 703/22 |
| 7,174,230 B2* | 2/2007 | Arackaparambil et al. | 700/96 |
| 7,174,232 B2 | 2/2007 | Chua et al. | |
| 7,203,634 B2* | 4/2007 | Jayaram et al. | 703/22 |
| 7,228,192 B2* | 6/2007 | Popplewell | 700/115 |
| 7,266,476 B2* | 9/2007 | Coburn et al. | 702/183 |
| 7,272,459 B2* | 9/2007 | Kokotov et al. | 700/97 |
| 7,356,377 B2* | 4/2008 | Schwarm | 700/108 |
| 7,366,643 B2* | 4/2008 | Verdura et al. | 703/1 |
| 7,526,359 B2* | 4/2009 | Landers et al. | 700/182 |
| 7,703,082 B2* | 4/2010 | Andrews et al. | 717/129 |
| 2002/0120920 A1* | 8/2002 | Jayaram et al. | 717/137 |
| 2002/0120921 A1* | 8/2002 | Coburn et al. | 717/140 |
| 2003/0182083 A1* | 9/2003 | Schwenke et al. | 702/183 |
| 2004/0073404 A1* | 4/2004 | Brooks et al. | 702/183 |
| 2004/0128120 A1* | 7/2004 | Coburn et al. | 703/26 |
| 2004/0162741 A1* | 8/2004 | Flaxer et al. | 705/7 |
| 2005/0010492 A1* | 1/2005 | Mitsutake et al. | 705/26 |
| 2005/0049883 A1* | 3/2005 | Boroson et al. | 705/1 |
| 2005/0055181 A1* | 3/2005 | Verdura et al. | 703/1 |
| 2005/0080502 A1* | 4/2005 | Chernyak et al. | 700/97 |
| 2005/0183948 A1* | 8/2005 | Rusta-Sallehy et al. | 204/228.6 |
| 2005/0251501 A1* | 11/2005 | Phillips et al. | 707/2 |
| 2005/0251527 A1* | 11/2005 | Phillips et al. | 707/101 |
| 2006/0004802 A1* | 1/2006 | Phillips et al. | 707/101 |
| 2006/0095274 A1* | 5/2006 | Phillips et al. | 705/1 |
| 2006/0106485 A1* | 5/2006 | Landers et al. | 700/182 |
| 2006/0218478 A1 | 9/2006 | Nonclercq et al. | |
| 2007/0013709 A1 | 1/2007 | Charles et al. | |
| 2008/0015823 A1* | 1/2008 | Arnold et al. | 703/1 |
| 2008/0077902 A1* | 3/2008 | Harashima et al. | 716/11 |
| 2008/0126424 A1* | 5/2008 | Koishi et al. | 707/104.1 |
| 2008/0154909 A1* | 6/2008 | Dam et al. | 707/10 |
| 2008/0256506 A1* | 10/2008 | Chaar et al. | 717/101 |
| 2008/0300710 A1* | 12/2008 | Cogswell et al. | 700/105 |

OTHER PUBLICATIONS

Research on a Generalized Die CAD System Architecture Based on SOA and Web Service Xinhua Yang1, Feilong Tang2, and Wu Deng1. H.T. Shen et al. (Eds.): APWeb Workshops 2006, LNCS 3842, pp. 625-631, 2006.*
CORBA Based Information Integration Platform for CIMS Gao Liang 1, Zhang Jie 1, Li Pei-gen 1, Felix T. S. Chan 2. Wuhan University Journal of Natural Sciences vol. 7 No. 1 2002,071-076.*
A web-based manufacturing service system for rapid product development Hongbo Lana, Yucheng Dinga,*, Jun Honga, Hailiang Huangb, Bingheng Lua. Computers in Industry 54 (2004) 51-67.*
CORBA-based integration framework for distributed shop floor control. Junho Shin, Sungsik Park, Chuljin Ju, Hyunbo Cho. Computers & Industrial Engineering 45 (2003) 457-474.*
Document-Driven Design for Distributed CAD Services in Service-Oriented Architecture. Yan Wang Bart O. Nnaji Wei-Shan Chiang. ASME 2005 International Design Engineering Technical Conferences and Computers and Information in Engineering Conference Sep. 24-28, 2005. pp. 1-13.*
A Distributed Product Realization Environment for Design and Manufacturing Jonathan F. Gerhard1, David Rosen2, Janet K. Allen 3, Farrokh Mistree. 2000 ASME Design Engineering Technical Conference Sep. 10-13, 2000. pp. 1-11.*
An XML-Based Macro Data Representation for a Parametric CAD Model Exchange. Jeongsam Yang1, Soonhung Han2, Joonmyun Cho3, Byungchul Kim4 and Hyun Yup Lee. ComputerAided Design and Applications (2004). vol. 1, Issue: 1-4, pp. 153-162.*
Application Integration Platform for an Agile Manufacturing Environment Based on CORBA/Agent Yin-Zhang Guo, Yan Wang, Jan-Chao Zeng. Proceedings of the Fifth International Conference on Machine Learning and Cybernetics, Dalian, Aug. 13-16, 2006. pp. 1-7.*
Using CORBA to integrate manufacturing cells to a virtual enterprise Carmen M. Pancerella and Robert A. Whiteside. SPIE vol. 2913, Proceedings of Plug and Play Software for Agile Manufacturing, Boston, Massachusetts, Nov. 18-19, 1996. pp. 1-15.*
Integrating Producibility and Product Performance Tools Within a Web-Service Environment Kurt A. Beiter and Kosuke Ishii. ASME 2003 Design Engineering Technical Conferences and Computers and Information in Engineering Conference Chicago, Illinois USA, Sep. 2-6, 2003. pp. 1-8.*
CENIT—The PLM company (2005). SAP's PLM integration for CATIA V5. presentation pp. 1-16.*
International Search Report for PCT/US2008/062402; Sep. 25, 2008; 14 pages.
Chan, F, et al.; Agent- and COBRA-Based Application Integration Platform for an Agile Manufacturing Environment; International Journal of Advanced Manufacturing Technology; 2003; pp. 460-468; vol. 21, No. 6; Springer-Verlag UK.

* cited by examiner

METHODS AND SYSTEMS FOR MANAGING ELECTRONIC WORK INSTRUCTIONS FOR MANUFACTURE OF PRODUCT

BACKGROUND OF THE INVENTION

This invention relates generally to computer systems and methods that facilitate product design and manufacturing. More specifically, the invention relates to methods and systems for managing the integration of virtual design systems with physical manufacturing systems.

Computer systems and software for designing products are advantageous, including Computer-Aided Design (CAD) systems in which the physical structure of potential products may be defined and optimized, Computer-Aided Engineering (CAE) systems that simulate the physical behavior of the potential products and allow virtual product testing and performance evaluation, and Computer-Aided Manufacturing (CAM) systems for defining and optimizing manufacturing processes and operations for potential products. Using such computer systems, potential products and their manufacture may be designed, modeled, and tested in a virtual on-line environment. For example, in an aircraft design context, computer systems may be utilized to model the entire aircraft and its manufacture, including all of its electrical or mechanical systems, sub-systems, parts, components, mechanisms, or assemblies that define the aircraft. Such designs may be enormously complex, and managing information and data relating to such designs among different computer systems is challenging.

In particular, compatibility issues between different computer systems owned and operated by different business entities can be a significant impediment to effective use of information and data generated by or utilized by the respective systems. Also, difficulties associated with adaptations to and modifications of computer modeled designs during physical manufacture and production processes may lead to costly production delays and undesirable discrepancies between products as designed and products as built.

BRIEF DESCRIPTION OF THE INVENTION

Consistent with embodiments of the present disclosure, systems and methods are disclosed for efficiently managing data and information corresponding to a computer modeled manufacture of a product that is utilized by different computer systems in the design and manufacturing process.

An exemplary embodiment of a method of revising electronic work instructions for manufacture of a product in mid-production by a manufacturing execution system (MES) is disclosed. The electronic work instructions are generated by a computerized manufacturing process planning (MPP) system, and the MPP system and the MES being remotely located from one another. The method comprises: interfacing the MPP system and the MES with an integration server; storing a released electronic work instruction for execution by the MES on the MPP system; communicating the electronic work instruction to the MES via the integration server; interrupting the execution of the electronic work instruction by the MES; and accepting a revision to the released electronic work instruction.

A method of manufacturing a product that is being electronically modeled on a computerized manufacturing process planning (MPP) system that generates electronic work instructions for execution by an electronic manufacturing execution system (MES) is also disclosed. The electronic work instructions are stored on the MPP system and the MPP system and the MES are remotely located from one another. The method comprises: interfacing the MPP system and the MES with an integration server separately provided from either of the MPP system and the MES; communicating the electronic work instruction to the MES via the integration server; executing the electronic work instruction with the MES; and while the MES is executing the electronic work instruction: pausing the execution of the electronic work instruction; revising the electronic work instruction to effect a change to the electronic work instruction; and re-communicating the revised electronic work instruction to the MES.

A networked computer system for manufacturing of a product is also disclosed. The system comprises: a manufacturing process planning (MPP) system adapted to create a computer model of the product manufacture and to generate electronic work instructions for manufacturing of the product; a computerized manufacturing execution system (MES) remotely located from the MPP system, the MES adapted to receive the electronic work instructions and perform corresponding manufacturing steps to produce the product; and an integration server separately provided from the MPP system and the MES. The integration server is configured to retrieve the electronic work instruction from the MPP system after the MES has initiated performance of manufacturing steps but not yet completed the performing steps, and the integration server is adapted to re-release a revised version of the electronic work instruction.

A computer program embodied on a computer readable medium for managing electronically modeled product and manufacture data and information exchange between a computerized manufacturing process planning (MPP) system and an electronic manufacturing execution system (MES) remotely located from one another is also disclosed. The program is embodied on an integration server connected between the MPP and the MES and the MPP system generates electronic work instructions for execution by the (MES). The program comprising at least one code segment that: communicates the electronic work instruction to the MES via the integration server; and while the MES is executing the electronic work instruction: pauses the execution of the electronic work instruction; accepts a revision to the electronic work instruction to effect a change to the electronic work instruction; and re-communicates the revised electronic work instruction to the MES.

It is to be understood that both the foregoing brief description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Exemplary embodiments of methods and systems are disclosed hereinbelow that facilitate efficient transfer of data and information between different computer systems for the design and manufacture of potential products. As a result, incompatibility between the data input and output formats of the of the respective systems are effectively resolved, and computer modeled designs may be adapted and modified in a timely manner while preserving integrity and correspondence between as-built and as-designed data. Consequently, considerable reduction in time and expense associated with the product design and manufacture is realized.

In order to appreciate the invention to its fullest extent, the following disclosure will be segmented into different parts or segments, wherein Part I introduces particular difficulties and problems associated with computer systems for the design and manufacture of potential products, Part II discloses exemplary embodiments of systems according to the present invention, and Part III discloses exemplary inventive methods and processes utilized by the systems disclosed in Part II.

I. Introduction

Manufacturing Process Planning (MPP) systems allow product manufacture to be digitally modeled and evaluated in virtual form before being physically implemented in real world manufacturing processes. Using computerized systems, manufacturing issues can by analyzed and improvements can be made before capital expenditures are incurred to purchase or configure machines and equipment capable of manufacturing a product for use or sale. Such MPP systems allow manufacturing resources to analyzed and more efficiently allocated.

One type of Manufacturing Process Planning system includes commercially available Product Lifecycle Management (PLM) solutions, which refer to a computer-implemented strategy that helps companies to share product data, apply common processes, and leverage corporate knowledge for the development of products from conception to the end of their life. Using PLM solutions, key persons across a business enterprise, including but not limited to company departments, business partners, suppliers, Original Equipment Manufacturers (OEM), and customers, may participate to conceptualize, design, build, and support potential products and processes. Some PLM solutions make it for instance possible to design and develop products by creating digital mockups such as 3D graphical models of a product, and the digital models may be defined and simulated to analyze performance aspects and specifications. Lean digital manufacturing processes may also be defined and modeled using a PLM solution. Such PLM systems and programs include those offered by Dassault Systemes of Paris, France.

The PLM solution provided by Dassault Systemes under the trademarks CATIA, ENOVIA and DELMIA provides an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs, respectively. The PLM system delivers an open object model linking products, processes, resources to enable dynamic, knowledge-based product creation and decision support that drives optimized product definition, manufacturing preparation, production and service. Such PLM systems include a relational database of products. The database comprises a set of data and relations between the data. Data typically include technical data related to the products, with the data being ordered in a hierarchy of data and are indexed to be searchable. The data are representative of the modeled objects, which are often modeled products and processes.

With PLM systems, product lifecycle information including product configuration, process knowledge and resources information are typically intended to be edited in a collaborative way using PLM systems using a collaborative workspace and an interconnected environment in which all participants in the product lifecycle can access and interact with each other's designs as they evolve, thereby enhancing communication through exchange, direct use, simulation and validation in 2D, 3D or textual environment. The participants may include product designers and engineers, company management, product marketing personnel, sales personnel, manufacturing personnel, OEM personnel, supplier personnel, and even product customers.

The benefits of such PLM systems are numerous, but practical difficulties remain when using such systems. For example, product design and manufacture data generated with a PLM system is often of great interest to parties using other computer systems and software, sometimes referred to as peripheral computer systems, that are separately provided from the PLM system. Such peripheral systems are often obtained from a different hardware/software vendor than for the PLM system, but are valuable to analyze certain aspects of the product design or manufacture. As a result, some incompatibility between the data input and output formats of the PLM system and the data input and output formats of the peripheral systems often arises.

Conventionally, such incompatibility issues leads to manual data sifting, data manipulation, and reformatting of data prior to actual use by the peripheral systems. Likewise, before data outputs of the peripheral systems may be used by the PLM system, it must also typically be sifted, manipulated or reformatted. In a large complex product and manufacture design, such as the design and manufacture of an aircraft, significant amounts of time can be spent dealing with nothing but data transfer compatibility issues between different computer systems used by the various parties involved.

As another example of practical difficulties encountered using known PLM systems, the conversion from the digital or virtual environment of the PLM system to real world manufacturing implementation of a product can sometimes by challenging. The Digital Enterprise Lean Manufacturing Interactive Application (DELMIA) of Dassault Systemes, for example, includes tools to create a Shop Order Release (SOR) to commence physical manufacture of a product, and also Shop Order Instances (SOIs) that provide electronic work instructions and authorizations to the shop floor where the manufacturing is to occur. The SOIs may be directly integrated with a Manufacturing Execution System (MES) and/or Enterprise Resource Planning (ERP) system that coordinates and monitors the manufacturing processes.

From time to time, however, it has been found that as SOIs are being executed on the shop floor, one or more changes or deviations from the SOIs become advisable. For example, for reasons that may not may be apparent in the digital DELMIA environment, it may be found on the shop floor that manufacture according to the SOI is impractical, unnecessarily difficult, beyond the limitations of the machinery and equipment actually being utilized, or prohibitively expensive to perform in the real world. Reconciling such changes and adaptations from the electronic SOIs to the physical manufacture in mid-production can be challenging and may lead to costly delays.

In particular, creating a new shop order through DELMIA that would produce a new SOI including necessary changes can be time consuming. Mid-production manufacturing changes, or changes made after some but not all manufacturing steps are complete for a given stage of manufacture, can also be problematic in that they may result in "as built" product data discrepancies from the product data "as designed." For example, when manufacturing processes are changed after they have been initiated and are actually in process, creation of a new shop order to reflect necessary changes may result in changes or revision to manufacturing process steps that have already been executed on the shop floor. Because executed manufacturing processes may not be easily reworked, if at all, products as built whose manufacture was in-process at the time of the new SOI will therefore deviate from products built after the new SOI is generated and released. Such as built versus as designed discrepancies may lead to confusion and uncertainty that may complicate post-production maintenance and service of products in the field, and may lead to undesirable performance and reliability issues and variations in manufactured products.

II. Exemplary Inventive Systems

The following detailed description refers to the accompanying drawings. Wherever possible, the same reference numbers are used in the drawings and the following description to refer to the same or similar parts. While several exemplary embodiments and features are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the methods and systems described herein. Instead, the proper scope of the invention is defined by the appended claims.

Figure 1:
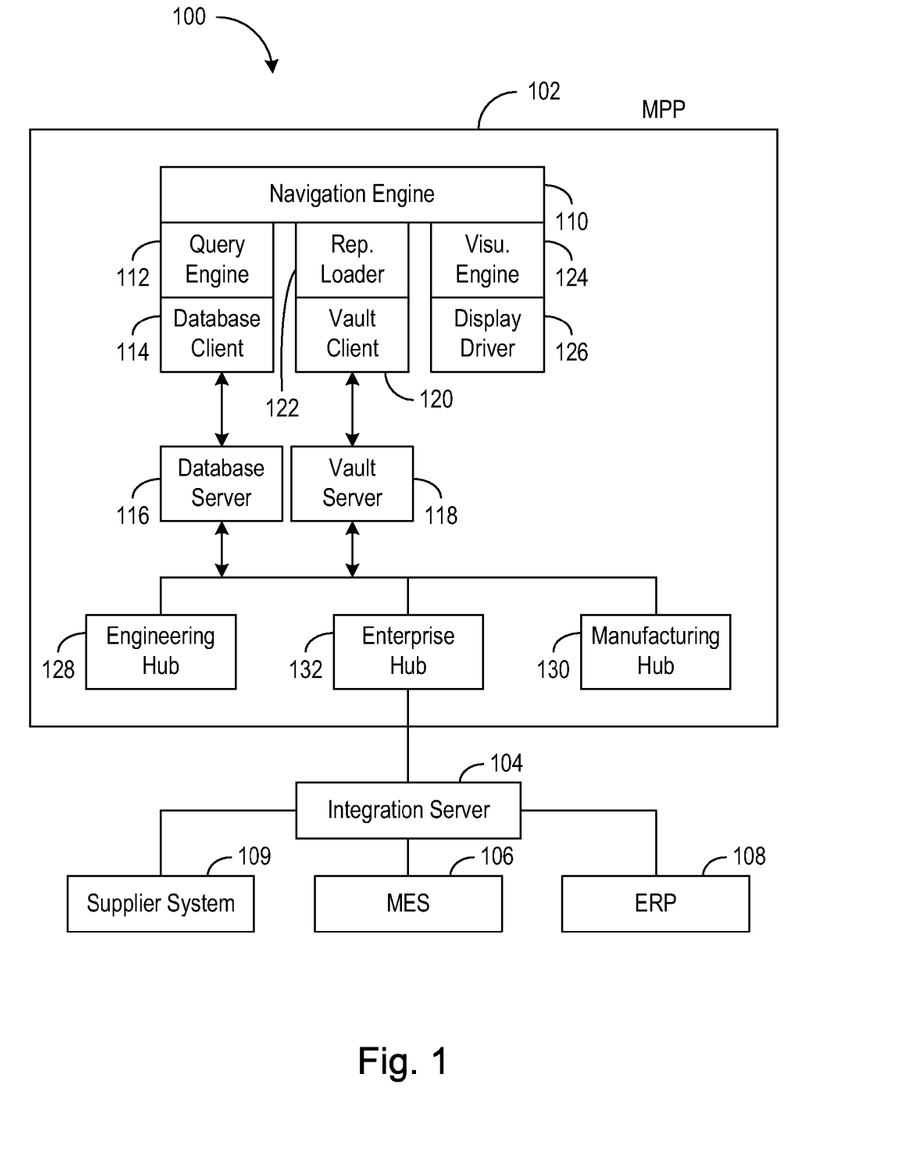
FIG. 1 schematically represents an exemplary embodiment of a computer system according to the present invention.

FIG. 1 schematically represents an exemplary embodiment of a networked computer system 100 according to an exemplary embodiment. The network may be accomplished, for example, using local area network (LAN) and/or wide area networks (WAN), and can include all of the necessary circuitry for such a connection. In one embodiment, the network is an Internet-based or web-based network allowing remote connection of different computers utilizing standard web interfaces.

The system 100 may be implemented when computer program instructions are loaded onto the various computers or other general purpose programmable machines to produce the various specialized machines found on the network, such that the instructions that execute on the computers or other programmable machines implement the functions specified in the block diagrams, schematic diagrams or flowcharts discussed below. Such computer program instructions may also be stored in a computer-readable medium that when loaded into a computer or other programmable machine can direct the machine to function in a particular manner, such that the instructions stored in the computer-readable medium produces instructions that implement the function specified in the block diagrams, schematic diagrams or flowcharts. In addition, the computer program instructions may be loaded into one or more of the computer systems illustrated or other programmable machine to cause a series of operational steps to be performed by the system 100 to produce a computer-implemented process, such that the instructions that execute on the computer or other programmable machine may provide steps for implementing the functions specified in the block diagrams, schematic diagrams, flowchart blocks or steps discussed herein.

As shown in FIG. 1, the system 100 includes a Manufacturing Process Planning (MPP) system 102, an integration server 104, a Manufacturing Execution System 106, and an Enterprise Resource Planning (ERP) system 108, and a manufacturing vendor or supplier system 109. The MPP system 102, the MES 106, the ERP system 108, and the supplier system 109 may be known computer systems in an exemplary embodiment, with the integration server 104 interfacing the MPP system 102 with the MES 106, the ERP system 108, and the supplier system 109. In such an embodiment, the integration server 104 is not an operative component or part of any of the MPP system 102, the MES 106, the ERP system 108, or the supplier system 109. Rather, the integration server is separately provided from the systems 102, 106, 108 and 109 and is supplied to the system 100 to integrate them in a beneficial manner as explained in some detail below.

In an exemplary embodiment, the MPP system 102 may be a known Product Lifecycle Management (PLM) solution commercially available from Dassault Systemes under the trademarks CATIA, ENOVIA and DELMIA, although other PLM systems may be utilized. The MPP system is configured to model the design and manufacture of a potential product, and facilitate collaborative development by a number of persons across a business enterprise as explained above. Authorized persons may access modeled product data, modeled manufacture data, and other information using appropriate user interfaces that are familiar to those in the art.

The MPP system 102 may include, for example, a navigation engine 110, a query engine 112, a database client 114 and database server 116. Query engine 112 is controlled by the navigation engine 110; and it builds database statements depending on a user's commands and passes the database statements to the database client 114. The query engine 112 also manages query results received from the database client 114.

The database client 114 is adapted to manage database server connection. It receives queries from query engine 112 and passes the queries to database server 116. It receives query results from database server 116 and passes these results to query engine 112.

Database server 116 receives queries from several database clients, such as client 114, and serves these queries. Database server 116 is typically a relational database and may be implemented using, for example, the solutions available from IBM under reference DB2 or available from Oracle. The database could also be an object or XML database, or an application server accessing a database. The application server may also provide processing, on the fly or asynchronously, for advanced query such as proximity query, spatial query, and the like.

The MPP system 102, may also include a vault server 118, for storing and providing representations of modeled objects contained in the database. That is, the vault server 118 is used as representations repository. The vault server 118 may be a file server, whereby representations could be stored in various files. The vault server 118 may also be implemented using a database server, using for instance "blob" (binary language object) storage. The vault server 118 also may utilize proxy and/or cache technologies. The representations of objects stored may be stored in the vault server may exists in various formats, e.g. bounding-box, polygons, bitmap images, vector images, subdivision surfaces or more generally any format known in the art.

The vault server 118 is addressed with a vault client 120. The vault client 120 makes it possible for the client to address the vault server 118 for retrieving representations of objects. A representation loader 122 may also be included, and the representation loader 122 queries the vault server 118, through the vault client 120, for obtaining the representations of the objects to be displayed to the user. In addition, the representation loader 122 may manage representation utilizing incremental loading, upon receiving representations from vault client 120.

A visualization engine 124 may manage representation display to the user. It addresses a display driver 126, which manages the display hardware such as a graphic card in most instances. For the purpose of displaying representations on the display hardware, accelerated hardware may be used, through an OpenGL driver, or using Microsoft Direct 3D, or DirectX.

As shown in FIG. 1, the MPP system 102 may further include an Engineering Hub 128 which organizes product engineering knowledge, a Manufacturing Hub 130 which manages manufacturing engineering knowledge, and an Enterprise Hub 132 which enables enterprise integrations and connections into both the Engineering and Manufacturing Hubs, respectively. The hubs 128, 130, 132 may be implemented in relational databases in the MPP system 102, and each of the hubs 128, 130 and 132 may utilize modeled objects for performing their respective functions. Using the modeled objects, potential products and their manufacture may be designed, tested, and optimized using the navigation engine 110 and the various hubs 128, 130 and 132. As used herein, "product" may refer to any commodity and/or any of its component parts or assemblies. As an illustrative example, the potential product may be an entire aircraft or any of its component systems, assemblies, and parts.

The MPP system 102 may be a web-accessed system or platform that is located remotely from the MES 106 and the ERP system 108 of any particular manufacturer, and also remotely located from the manufacturer supplier system 109. The MES 106, the ERP system 108 and other similar systems providing such functionality are believed to be familiar to those in the art and typically are located on site at a manufacturing facility that includes one or more areas that are often referred to as a "shop floor" containing necessary machinery, fixtures, tools and controls upon which products are physically manufactured. More than one manufacturing site may be involved using the same or different MES 106 or ERP system 108 for various aspects of the product manufacture and assembly for a complicated project such as the manufacture of an aircraft.

In an exemplary embodiment, the manufacturing hub 130 may be the Digital Enterprise Lean Manufacturing Interactive Application (DELMIA) of Dassault Systemes, and may be used to communicate data to the MES 106. As previously noted, DELMIA includes tools to create a Shop Order Release (SOR) to commence physical manufacture of a product, and also Shop Order Instances (SOIs) that provide electronic work instructions and authorizations to the shop floor where the MES 106 commences real world manufacturing of modeled products using the electronic instructions. While much of the discussion below relates to SOIs, it is to be understood that SOIs created by the DELMIA application are but one type of electronic work instruction, and others may likewise be utilized in other embodiments without limitation.

The SOIs may contain, among other things, and for example only: data and information relating to raw materials to be utilized; data and information relating to surface treatments such as paints, coatings and sealants; data and information relating to inspection points and datum for quality control purposes; control data and information for performing specific process steps, such as numerical control data executable by machines to shape, form, and finish raw materials into component parts; and data and information regarding assembly of component parts to produce mechanisms, assemblies and sub-systems of a product. The SOIs may be stored in for example, the manufacturing hub 130 of the MPP system 102 or elsewhere on the MPP system 102. The ERP system 108 may also communicate with the MPP system 102 to obtain necessary data and information, including but not limited to SOIs.

Instead of directly communicating the SOIs with the (MES) 106 and/or Enterprise Resource Planning (ERP) 108 that coordinates and monitors the manufacturing processes, the system 100 includes the integration server 104 interfacing the MPP system 102 with the MES 106 and the ERP 108, and also interfacing the MPP system 102 with the vendor or supplier system 109.

The integration Server 104 is designed to meet the need for Manufacturing Process Plans generated in the MPP system 102 to be delivered to downstream systems such as the MES 106 the ERP System 108, and vendor or supplier systems 109 of manufacturing suppliers of materials, components, etc. needed to manufacture the product. Data from these MPP system 102 is utilized by the MES 106, the ERP system 108, and the supplier systems 109 for purposes of job scheduling, resource planning, procurement, and shop floor work instruction delivery. The integration server 104 provides a seamless, automated method of delivering this Manufacturing Process Planning data from the MPP system 102 to the systems that will ultimately use it, as described in some detail below, thereby obtaining considerable time and expense of resolving data format conflicts between the interconnected systems and manual sifting and manipulation of data to provide each system with only the data that it actually needs to perform a task, in the required data format.

The integration server 104 is also accessible to, for example, manufacturing engineers and personnel at the shop floor where manufacturing operations actually occur, and provides the capability to revise a released shop order, as opposed to creating an entirely new shop order, within the authoring environment of the MPP system 102, such as with the DELMIA application. By revising released SOI's within DELMIA, for example, the manufacturing engineer is able to leverage the process analysis, work instruction templates and generative work instruction capabilities that are available when authoring, for example, Job Plan masters in DELMIA.

Unlike conventional systems, the system 100 is amenable to methods of modifying an "in-process" shop order that is being executed on the shop floor, by extracting the shop order from the MPP system 102, facilitating appropriate modification of fields of the shop order, and injecting the SOI back into the MPP system 102 "in process". Modification of SOIs that are embedded within the DELMIA planning environment allows as planned and as built product configuration to be quickly reconciled. By updating SOI information that DELMIA has generated with the integration server 104, rather than recreating entirely new SOIs using the MPP system 102, mid-production revisions to manufacturing design is facilitated with much less delay. The integration server 104 may be particularly advantageous when used with, for example, CATIA DELMIA V5 CAD CAM Tools of Dassault Systemes.

Figure 2:
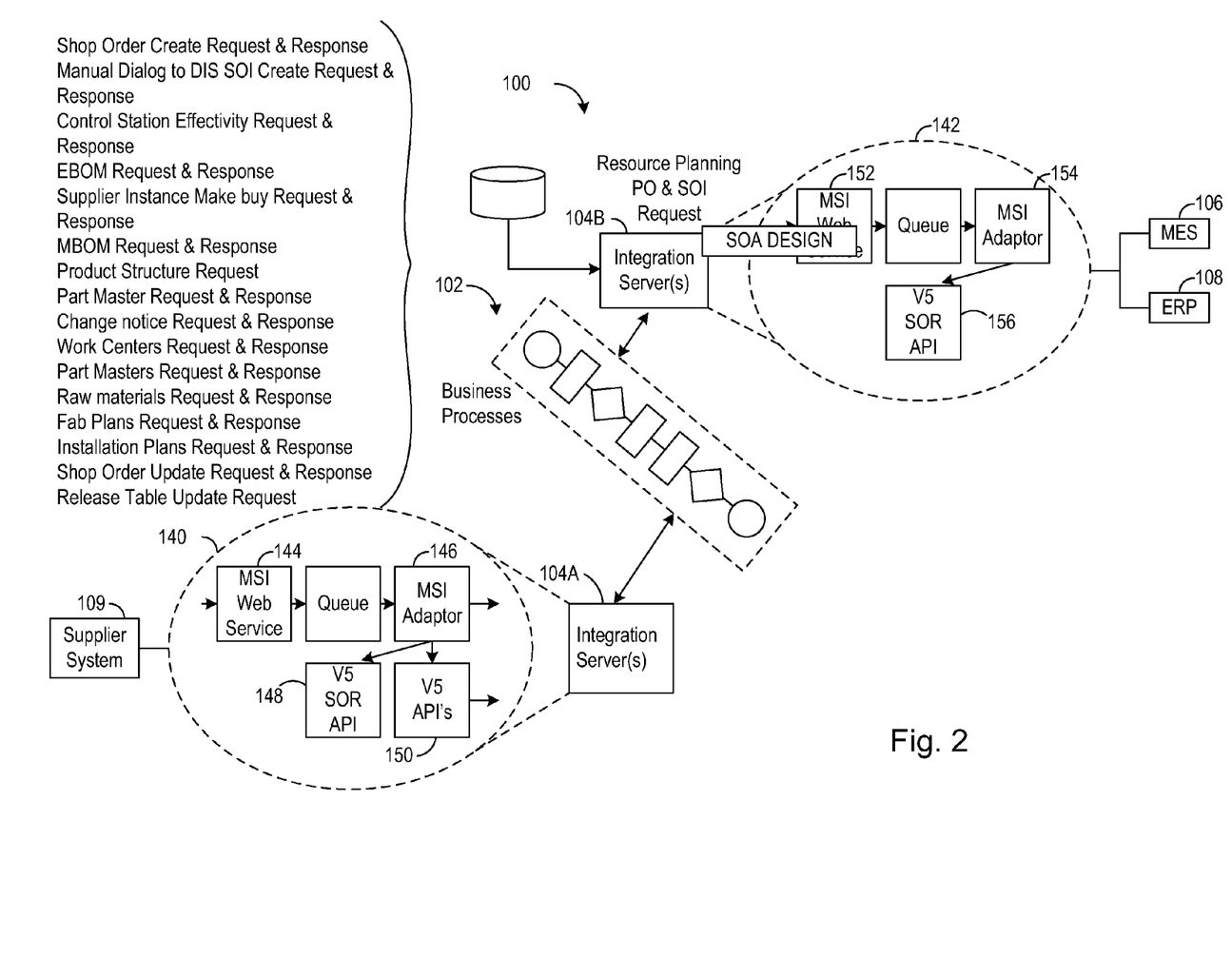
FIG. 2 schematically represents a further embodiment of the system shown in FIG. 1 illustrating the system in a business environment.

FIG. 2 schematically represents a further embodiment of the system 100 shown in FIG. 1 illustrating the system in a business environment. The MPP system 102 is connected to the integration servers 104A and 104B, that in an exemplary embodiment implement a manufacturer supplier interface 140, and a business-entity interface 142, respectively. The manufacturer supplier interface 140 provides access to vendors and suppliers, via the integration server 104A, to request data and information from the MPP system 102, and the business-entity interface 142 allows data requests, via the integration server 104B, to the MPP system 102 from the MES 106 and the ERP 108.

As shown in FIG. 2, the MPP system 102 includes a variety of data and information that may be requested from the peripheral systems 106, 108 and 109. For purposes of illustration only, the data may include a shop order creation for manufacture of a product, control data for the manufacture of the product, an engineering bill of materials, a manufacturer bill of materials, a supplier request, a product structure request, a part master request, a change notice, a work center request, a raw material request, a fabrication plan, an installation plan, a shop order update, and a release table update.

As also shown in FIG. 2, the manufacturer supplier interface 140 may include a web interface 144, an optional adaptor 146 and one or more application programming interfaces 148 and 150 converting a request for information, submitted via the supplier system 109, into a format recognized by the MPP system 102. Likewise, the business-entity interface 142 includes an optional adaptor 152 and one or more application programming interfaces 154 and 156 converting a request for information, submitted via, for example, one of the MES 106 and the ERP system 108, into a format recognized by the MPP system 102.

The adaptors and application programming interfaces (APIs) may be implemented in appropriate algorithms tailored to address compatibility issues between the MPP systems 102 and the peripheral systems 106, 108 and 109 in terms of data input, data output, and data format. As such, the integration servers 104A and 104B may be thought of as interpreters that bridge the differences in form and content of data input and output between the systems 102, 106, 108 and 109 and allow seamless communication between them in an automated manner. In such a manner, the integration servers 104A and 104B expose the functionality of the MPP system 102 through web service interfaces to peripheral computer systems of the business entity and/or to suppliers and vendors. The peripheral systems 106, 108 and 109 may utilize a service oriented architecture (SOA) allowing any of the system to access data from the MPP system 102 in whatever format and content required by the peripheral systems. The integration servers 104A and 104B avoid manual extraction of data, manual editing and conversion of data, and cumbersome transfer of data between incongruent computer systems. Business entities, vendors, and suppliers may therefore receive more timely updated data, without having to reformat it for practical use.

The integration servers 104A and 104B are scalable and capable of handling multiple requests by multiple peripheral systems using known queuing techniques. In a multiple entity vendor/supplier/department environment using computers with certain data input and output incompatibilities, the integration servers 104A and 104B are desirable to make the MPP system data available to other systems and downstream processes to maintain integrity and configuration of data.

III. Inventive Processes and Methods

Figure 3:
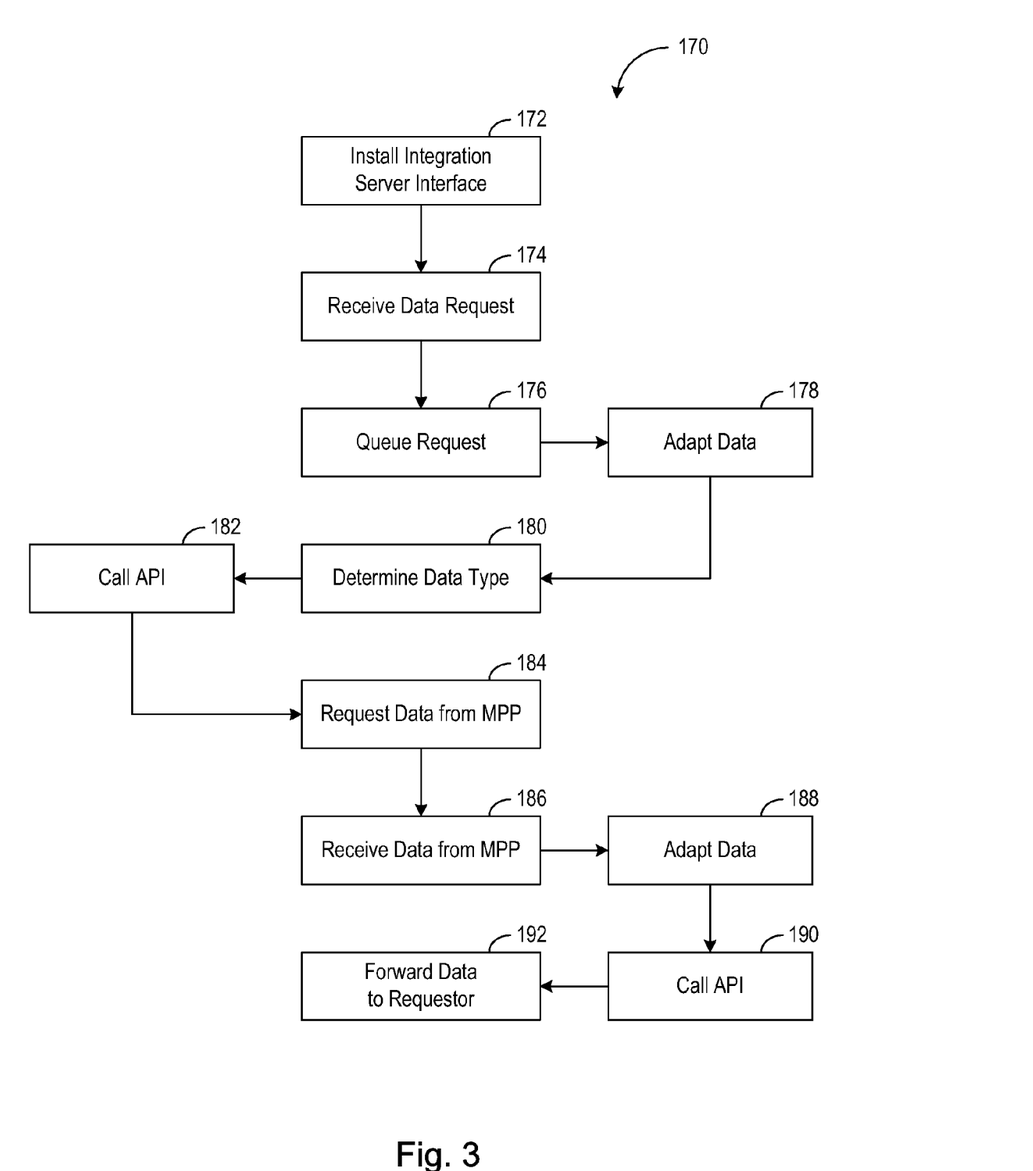
FIG. 3 illustrates an exemplary method flowchart illustrating processes performed by the system shown in FIGS. 1 and 2.

FIG. 3 illustrates an exemplary method flowchart 170 illustrating processes performed by the system 100 shown in FIGS. 1 and 2, and more specifically processes executable by the integration servers 104A and 104B. The flowchart 170 illustrates a method of distributing electronic data from an MPP system in a service oriented architecture to at least one peripheral computer system separately supplied from the MPP system, such as the MES, the ERP systems and the vendor/supplier systems discussed above.

As shown in FIG. 3, the integration servers may be installed 172 to interface the MPP system with the peripheral systems Once installed and so configured, the integration server or servers may receive 174 a service request for design or manufacturing data from the MPP system by any of the peripheral computer systems connected downstream from the MPP system. The requests for data, may be submitted, for example, through web interfaces of the peripheral computer systems to the MPP system.

Once received, data requests are queued 176 on the integration servers using known techniques, and the integration servers proceed to process the data requests, for example, in the order that they are received. It is contemplated, however, that certain requests may be flagged as priority requests that may be expedited and processed before other non-priority requests depending on the sophistication of the particular protocol used to submit requests.

Data requests may be processed by adapting 178 the data request to a form recognized by the MPP system, and determining 180 the particular data that is being requested. Also, if necessary, the data request may entail an application programming interface to be called 182 so that information can be requested or queried from the pertinent portion of the MPP system. The data is then requested 184, in a format compatible with the MPP system, by the integration server from the MPP system. The integration servers then wait for the MPP system to respond with the requested data in a predetermined format, such as an XML file having certain predefined information fields.

Once the requested data is received 186 by the integration servers, the integration servers proceed to adapt data 188 to the extent necessary, call 190 any application programming interfaces needed, and forward 192 the data to the requesting peripheral system in the required format. The data processing is performed automatically by the integration servers and is generally transparent to end users of the peripheral systems.

Additional steps may also performed in the method 170, such as data archiving, data mining techniques, and report compilation and utilization of request tracking in the protocol to evaluate system performance. Still other steps may be performed as desired.

The integration servers and the method 170 provide an effective tool to map any site-specific MPP system configuration to preferred data format and standards for use by the business entities. Cumbersome compatibility issues of incongruent systems insofar as data format and practices are concerned are avoided along with associated costs and delays of manipulating data to a readily usable form by other computer systems. All this is achievable with relatively straightforward site installation and configuration of the integration servers.

By way of example, in one implementation of the method 170, the integration server may process requests to Create Shop Orders made by the peripheral systems. For each request, the integration servers may create a Shop Order Instance (SOI) from the MPP system, and return an XML output file and CATProcess simulation file to the requesting peripheral system. The data extraction function itself is sufficiently responsive such that data can be retrieved without a significant delay. For example, generating the XML document may be accomplished in about 5 seconds or less, saving the CATProcess Document file may be accomplished in about 3 seconds or less, adding tracking information to the XML output file may be accomplished in about 1 second or less, and generation of a standard data extraction report may be accomplished in less than about 2 seconds. Considered over a lengthy period of time involved with, for example, the design, development and manufacture of an aircraft, time savings and associated expense can be significant such as for example, about a 3 to 6 month reduction of time in the development cycle.

Figure 4:
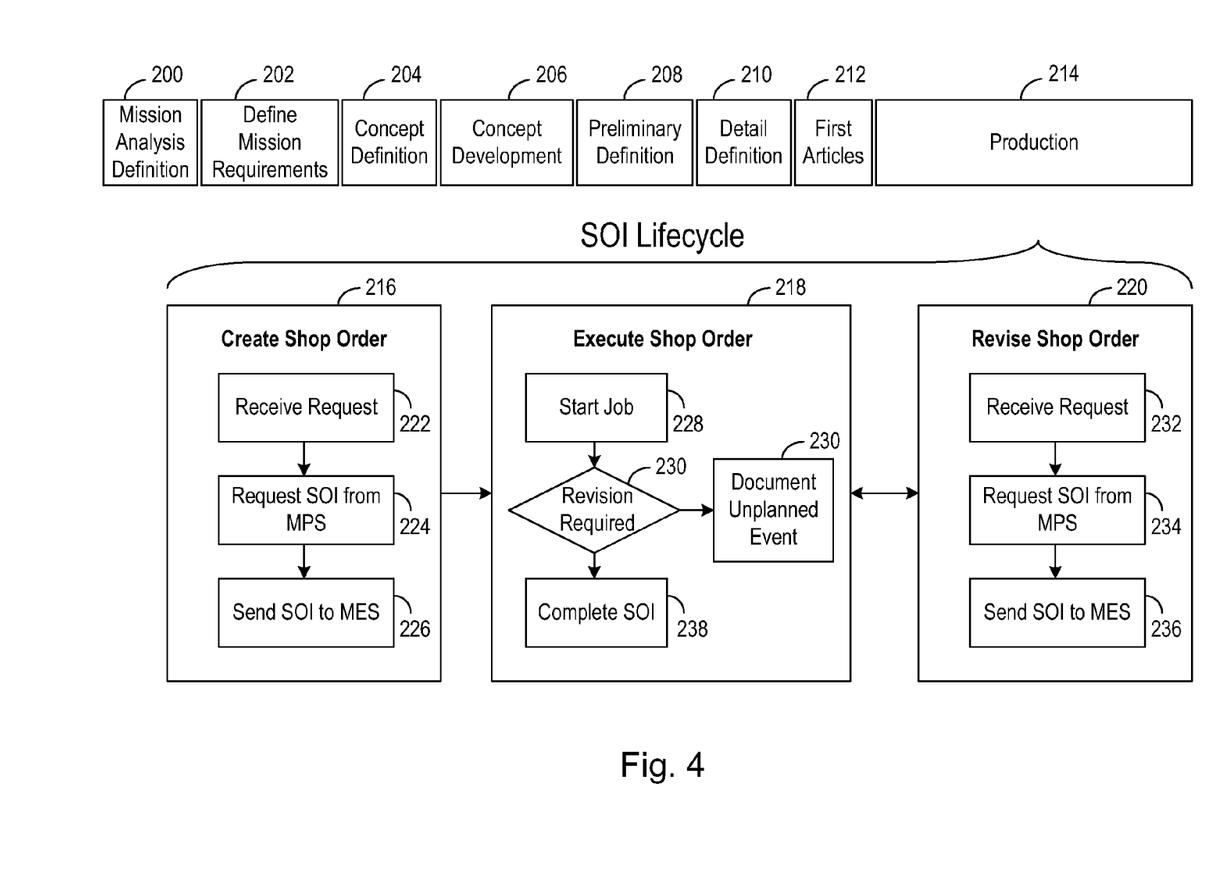
FIG. 4 schematically illustrates other exemplary processes utilized by the system shown in FIGS. 1 and 2.

FIG. 4 schematically illustrates other exemplary processes utilized by the system 100 shown in FIGS. 1 and 2. Specifically, FIG. 4 illustrates different phases of the MPP system design and development cycle, including a mission analysis definition phase 200, a define mission requirements phase 202, a concept definition phase 204, a concept development phase 206, a preliminary definition phase 208, a detail definition phase 210, a first articles phase 212, and a production phase 214. It is in the production phase 214 that the SOIs are implicated, and FIG. 4 illustrates the SOI lifecycle and processes performed by the integration servers to better facilitate manufacturing processes.

As shown in FIG. 4, the SOI lifecycle generally encompasses three distinct phases, namely creation 216, execution 218, and revision 220. The creation phase 216 involves receiving a request for shop order 222, requesting 224 an SOI from the MPP system, and sending 226 the SOI to, for example, the MES to commence physical manufacture of the product. The creation phase 216 in one embodiment generally encompasses the method 170 explained above and illustrated in FIG. 4, although the creation phase could alternatively be performed entirely within the MPP system itself.

The execution phase 218 includes starting the job 228 and performing manufacturing steps according to the electronic work instructions contained in the SOI. Once the job is started 228, it generally continues until, as noted above, an unplanned revision is required due to observations and limitations experienced on the manufacturing shop floor. If revision is required at step 230, the basis for the revision is documented 230 and the revision phase 220 is entered.

In the revision phase 220, the documentation is reviewed 232, typically by a manufacturing engineer or other responsible person, and in response to the documentation, the engineer or other person authors 234 a revision to the SOI being executed. Once the appropriate changes, modifications, or revisions are authored 234, the revised SOI is electronically released 236 and sent back to the execution phase 218 for completion of the SOI at step 238 from the point that revision was required. Notably, manufacturing steps that were executed prior to the revision being required at step 230 are not changed and are not re-executed, but rather the execution of the revised SOI occurs and applies to only the manufacturing steps that were not yet executed at the time that revision of the SOI was required and execution of the original SOI was interrupted or paused for the revision to the SOI. Integrity and correspondence of as built and as designed product data is therefore ensured.

Figure 5:
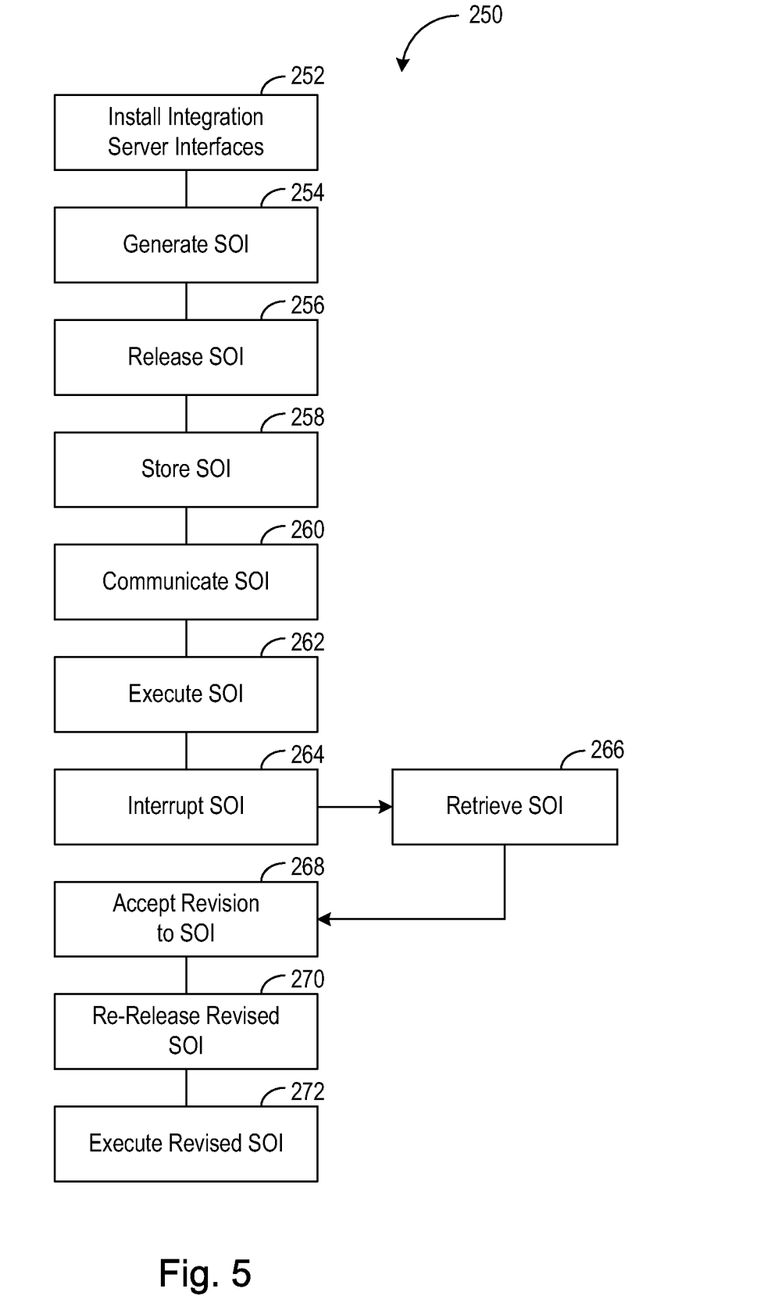
FIG. 5 illustrates an exemplary method flowchart implementing the processes represented in FIG. 4.

FIG. 5 illustrates an exemplary method flowchart implementing the processes represented in FIG. 4, and specifically illustrating the roles of the integration servers in revising electronic work instructions for manufacture of a product in mid-production by a manufacturing execution system (MES).

The method 250 includes installing 252 the integration servers as described above, generating 254 and releasing 256 the SOI to, for example the MES to commence manufacturing operations. The SOI may be generated and released in any manner explained above. Also, in an illustrative embodiment, the generation of the SOI may involve defining a plan type definition in the MPP system that allows the SOI to be represented within, for example, a DELMIA project. The SOI plan type allows the SOI to be stored 258 in the DELMIA Manufacturing Hub in context with, for example, the Job Plan masters in the DELMIA application.

When the released SOI is communicated 260 to the MES, manufacturing operations are commenced to execute 262 the SOI. Execution of the SOI continues until an unplanned event or observations leads to interruption 264 of the SOI execution until the SOI can be revised. At this point the integration server retrieves 266 the SOI so that a manufacturing engineer or other responsible person can author an appropriate revision. Retrieval of the SOI by the integration server may encompass some or all of the techniques described in relation to the method 170 for efficient data transfer and communication between the MPP system and the MES system that the engineer or other person may utilize to author revisions to the SOI.

When appropriate changes or revision to the interrupted SOI is made, the integration server accepts 268 the revised SOI and electronically re-releases 270 the SOI, including all revisions, to the MES to continue 272 its execution forward from the point of interruption at step 264. No changes to manufacturing steps executed prior to the interruption are made in the revision, thereby ensuring the integrity and correspondence of as built and as designed data in manufactured products.

Figure 6:
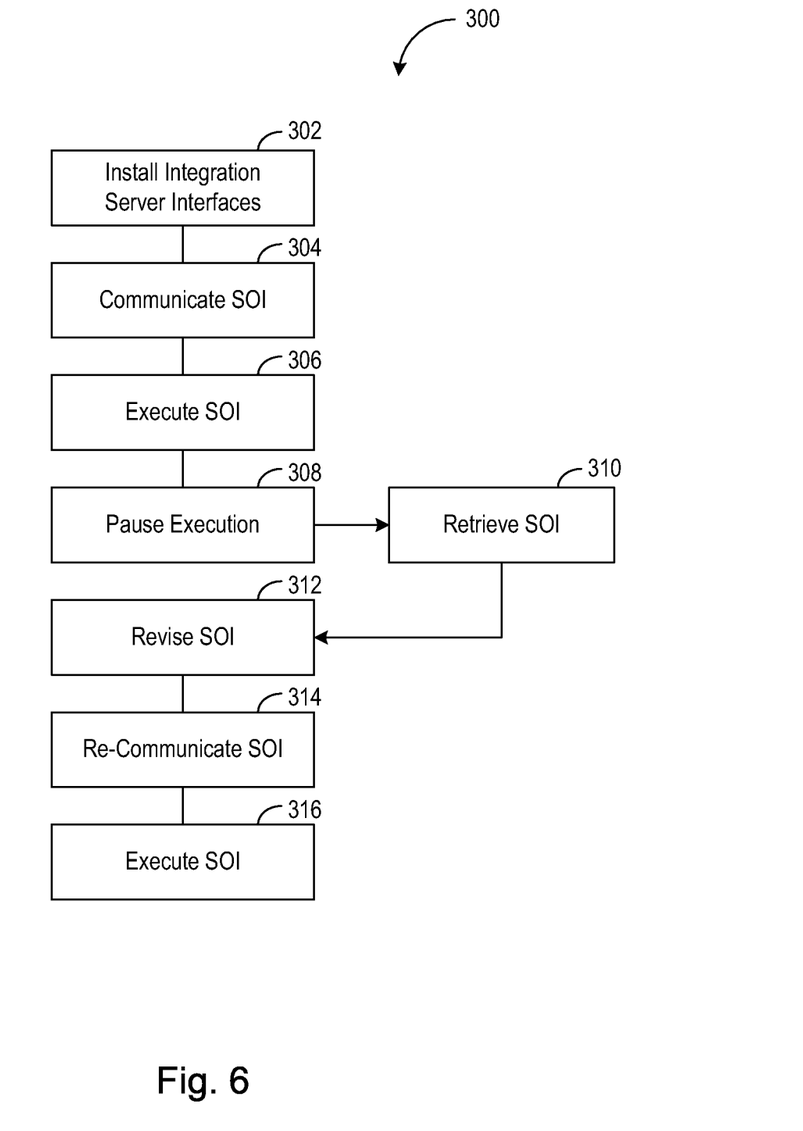
FIG. 6 illustrates another exemplary method flowchart implementing the processes represented in FIG. 4.

FIG. 6 also illustrates an exemplary method flowchart implementing the processes represented in FIG. 4, and specifically illustrating the roles of the integration servers in a method of manufacturing a product that is electronically modeled on the MPP system.

The method 300 shown in FIG. 6 includes installing 302 the integration servers as described above and communicating 304 the SOI to the MES to commence manufacturing operations. The SOI may be generated, released and communicated in any manner explained above. Like the method 250 described above, the generation of the SOI may involve defining a plan type definition in the MPP system that allows the SOI to be represented within, for example, a DELMIA project. The SOI plan type allows the SOI to be stored in the DELMIA Manufacturing Hub in context with, for example, the Job Plan masters in the DELMIA application.

When the released SOI is communicated 304 to the MES, manufacturing operations are commenced to execute 306 the SOI. Execution of the SOI continues until an unplanned event or observations leads to execution being paused 308 until the SOI can be revised. At this point the integration server retrieves 310 the SOI so that a manufacturing engineer or other responsible person can revise 312 the SOI. Retrieval of the SOI by the integration server may encompass some or all of the techniques described in relation to the method 170 for efficient data transfer and communication between the MPP system and the MES system that the engineer or other person may utilize to author revisions to the SOI.

When appropriate changes or revision to the paused SOI is made at step 312, the integration server re-communicates 314 the SOI, including all revisions, to the MES to continue 316 its execution forward from the point where it was paused at step 308. No changes to manufacturing steps executed prior to the pause are made in the revision, thereby ensuring the integrity and correspondence of as built and as designed data in manufactured products.

Using either of the methods 250 or 300, the ability to revise SOIs in mid-production of a product may result in a substantial reduction of production cycle time. For instance, expected cycle time for revising or updating a released shop order is expected to be 10 minutes or less in most circumstances. As-Planned versus As Built reconciliation can also be accomplished in about 10 minutes or less in most circumstances. Implementing a complex multi unit change to an SOI can likewise be accomplished in about 10 minutes or less.

Having now described some exemplary systems and exemplary methods and processes utilized by the systems, implementation of the same is believed to be a matter of programming the components so that their respective functions may be performed. Programming details are believed to be beyond the scope of this disclosure and within the ordinary skill in the art to implement without further discussion and detail, and so further detail and discussion thereof is believed to be unnecessary.

Inventive systems and methods having appreciable benefits are disclosed that address complex problems in managing the flow of data and information to and from MPP systems and peripheral computer systems in a large scale, complex product design and manufacture such as an aircraft design. The systems and methods further facilitate manufacturing changes and revisions in mid-production manufacturing processes with minimal delay and while ensuring integrity and correspondence of as built and as designed product and manufacture data. These and other benefits and advantages are now believed to be amply disclosed and demonstrated.

While exemplary methods and systems haves been described in terms of various specific embodiments, those skilled in the art will recognize that they can be practiced with modification within the spirit and scope of the claims.

What is claimed is:

1. A method of revising in-process shop order instances that result in updated electronic work instructions for shop floor manufacture of a product in mid-production by a manufacturing execution system (MES) that commences shop floor product manufacture, the updated electronic work instructions being generated by a computerized manufacturing process planning (MPP) system, the MPP system and the MES being remotely located from one another, the method comprising:

interfacing the MPP system and the MES with an integration server;

storing a released electronic work instruction for execution by the MES on the MPP system;

communicating the electronic work instruction to the MES via the integration server;

interrupting, after production of the product has commenced, the execution of the electronic work instruction by the MES based upon an unplanned event or observation occurring on the shop floor;

continuing the interruption until a revision to the shop order instance is accepted, wherein the revision results in an update to at least one released electronic work instruction that changes manufacturing process steps that have not been executed and does not result in a change to manufacturing processes steps that have already been executed;

wherein accepting the revision comprises:

extracting the shop order instance related to the interrupted electronic work instruction from the MPP system, the extracted shop order instance being in a first format;

adapting the extracted shop order instance in the first format to a second format that is not compatible with the MPP system;

facilitating, through a user interface, modification of one or more fields associated with the shop order instance in the second format;

adapting the modified shop order instance from the second format back to the first format; and placing the modified shop order instance in the first format back into the MPP without reworking of in-process instances of the product according to the revised electronic work instruction; and reconciling the at least one released electronic work instruction revision with as planned product and as built product.

2. The method of claim 1, further comprising retrieving the released electronic work instruction with the integration server.

3. The method of claim 1, further comprising electronically re-releasing the revised electronic work instruction to the MES for execution after the point of interruption.

4. The method of claim 1, further comprising storing the at least one revised electronic work instruction on the MPP.

5. The method of claim 1, wherein the MPP system comprises a Product Lifecycle Management (PLM) system.

6. The method of claim 5, wherein the PLM system comprises an manufacturing hub, the method comprising:

storing the released electronic work instruction in the manufacturing hub.

7. The method of claim 6, further comprising:

defining, with the MPP system, a shop order instance (SOI) plan type corresponding to the electronic work instruction.

8. A method of manufacturing a product, the product being electronically modeled on a computerized manufacturing process planning (MPP) system that generates electronic work instructions for execution by an electronic manufacturing execution system (MES), the electronic work instructions being stored on the MPP system and the MPP system and the MES being remotely located from one another, the method comprising:

interfacing the MPP system and the MES with an integration server separately provided from either of the MPP system and the MES;

communicating the electronic work instruction to the MES via the integration server;

executing the electronic work instruction with the MES; and while the MES is executing the electronic work instruction:

pausing the execution of the electronic work instruction based upon an unplanned event or observation occurring on a shop floor where the product is being manufactured;

continuing the pause until a revision is accepted to effect a change to the electronic work instruction;

upon acceptance, revising the electronic work instruction to effect a change to the electronic work instruction that changes manufacturing process steps that have not been executed and does not result in a change to manufacturing processes steps that have already been executed;

wherein accepting the revision comprises:

extracting the shop order instance related to the interrupted electronic work instruction from the MPP system, the extracted shop order instance being in a first format;

adapting the extracted shop order instance in the first format to a second format that is not compatible with the MPP system;

facilitating, through a user interface, modification of one or more fields associated with the shop order instance in the second format;

adapting the modified shop order instance from the second format back to the first format; and placing the modified shop order instance in the first format back into the MPP without reworking of in-process instances of the product according to the revised electronic work instruction;

re-communicating the revised electronic work instruction to the MES; and executing the revised electronic work instruction from the point that it was paused without reworking of in-process instances of the product according to the revised electronic work instruction.

9. The method of claim 8 further comprising storing the electronic work instruction on the MPP system.

10. The method of claim 8, further comprising retrieving the released electronic work instruction with the integration server.

11. The method of claim 8, wherein the electronic work instruction comprises a shop order instance (SOI).

12. The method of claim 8, wherein the MPP system comprises a Product Lifecycle Management (PLM) system.

13. The method of claim 12, wherein the PLM system comprises an manufacturing hub, the method comprising:

storing the released electronic work instruction in the manufacturing hub.

14. The method of claim 13, further comprising:

defining, with the MPP system, a shop order instance (SOI) plan type corresponding to the electronic work instruction.

15. A networked computer system for manufacturing of a product, the system comprising:

a manufacturing process planning (MPP) system adapted to create a computer model of the product manufacture and to generate electronic work instructions for manufacturing of the product;

a computerized manufacturing execution system (MES) remotely located from the MPP system, the MES adapted to receive the electronic work instructions and perform corresponding manufacturing steps to produce the product; and an integration server separately provided from the MPP system and the MES, the integration server configured to retrieve the electronic work instruction from the MPP system after the MES has initiated performance of manufacturing steps but not yet completed the performing steps and interrupt the execution of the electronic work instruction based upon a received input indicative of an unplanned event or observation occurring on a shop floor where the product is being manufactured, wherein the interruption continues until a revision of the electronic work instruction is accepted, wherein the revision of the electronic work instruction changes manufacturing process steps that have not been executed and does not result in a change to manufacturing processes steps that have already been executed, and upon acceptance of the revision of the electronic work instruction, the integration server adapted to re-release the revised version of the electronic work instruction, wherein accepting the revision comprises extracting the shop order instance related to the interrupted electronic work instruction from the MPP system, the extracted shop order instance being in a first format; adapting the extracted shop order instance in the first format to a second format that is not compatible with the MPP system; facilitating, through a user interface, modification of one or more fields associated with the shop order instance in the second format; adapting the modified shop order instance from the second format back to the first format; and placing the modified shop order instance in the first format back into the MPP without reworking of in-process instances of the product according to the revised electronic work instruction; the MES adapted to execute the revised electronic work instruction without reworking of in-process instances of the product according to the revised electronic work instruction.

16. The system of claim 15 wherein the MPP system is a Product Lifecycle Management (PLM) system.

17. The system of claim 15 wherein the MPP system comprises a shop order instance (SOI).

18. The system of claim 15 wherein the MES is adapted to execute the revised version of the electronic work instruction only for manufacturing steps that have not been completed.

19. A computer program embodied on a non-transitory computer readable medium for managing electronically modeled product and manufacture data and information exchange between a computerized manufacturing process planning (MPP) system and an electronic manufacturing execution system (MES) remotely located from one another, the program embodied on an integration server connected between the MPP and the MES and the MPP system generating electronic work instructions for execution by the (MES), the program comprising at least one code segment that:

communicates the electronic work instruction to the MES via the integration server; and while the MES is executing the electronic work instruction:

pausing the execution of the electronic work instruction based upon receiving data indicative of an unplanned event or observation occurring on a shop floor where the product is being manufactured;

continuing the pause until a revision is accepted to effect a change to the electronic work instruction;

accepting a revision to the electronic work instruction to effect a change to the electronic work instruction that changes manufacturing process steps that have not been executed and does not result in a change to manufacturing processes steps that have already been executed;

wherein accepting the revision comprises:

extracting the shop order instance related to the interrupted electronic work instruction from the MPP system, the extracted shop order instance being in a first format;

adapting the extracted shop order instance in the first format to a second format that is not compatible with the MPP system;

facilitating, through a user interface, modification of one or more fields associated with the shop order instance in the second format;

adapting the modified shop order instance from the second format back to the first format; and placing the modified shop order instance in the first format back into the MPP without reworking of in-process instances of the product according to the revised electronic work instruction;

re-communicating the revised electronic work instruction to the MES; and executing the revised electronic work instruction from the point that it was paused without reworking of in-process instances of the product according to the revised electronic work instruction.

\* \* \* \* \*